(12) United States Patent
Inoue et al.

(10) Patent No.: US 6,375,282 B1
(45) Date of Patent: Apr. 23, 2002

(54) BRAKE SYSTEM

(75) Inventors: Hidefumi Inoue; Yoshiyasu Takasaki, both of Saitama-Ken (JP)

(73) Assignee: Bosch Braking Systems, Co., Ltd., Tokyo (JP)

( * ) Notice: Subject to any disclaimer, the term of this patent is extended or adjusted under 35 U.S.C. 154(b) by 0 days.

(21) Appl. No.: 09/541,790

(22) Filed: Apr. 3, 2000

(30) Foreign Application Priority Data

Apr. 28, 1999 (JP) .......................................... 11-121843

(51) Int. Cl.[7] .................................................. B60T 8/32
(52) U.S. Cl. .................. 303/191; 303/122.04; 303/155; 303/113.4; 303/11; 303/15
(58) Field of Search ............................ 303/122.04, 191, 303/157, 158, 155, 125, 113.3, 113.4, 113.5, 10, 11, 115.2, 15

(56) References Cited

U.S. PATENT DOCUMENTS

| | | | |
|---|---|---|---|
| 5,172,964 A | 12/1992 | Levrai et al. | |
| 5,951,116 A | * 9/1999 | Nagasaka et al. | 303/15 X |
| 6,188,947 B1 | * 2/2001 | Zahn | 303/115.2 X |
| 6,193,332 B1 | * 2/2001 | Ono | 303/191 |
| 6,234,589 B1 | * 5/2001 | Yoshida | 303/157 |
| 6,238,016 B1 | * 5/2001 | Soga | 303/122.04 X |

FOREIGN PATENT DOCUMENTS

| | | |
|---|---|---|
| JP | 61-215156 | 9/1986 |
| JP | 4-262958 | 9/1992 |

\* cited by examiner

*Primary Examiner*—Christopher P. Schwartz
*Assistant Examiner*—Melanie Torres
(74) *Attorney, Agent, or Firm*—Flynn, Thiel, Boutell & Tanis, P.C.

(57) ABSTRACT

A brake system contains a safety mechanism which terminates an automatic brake upon detecting that unnecessary braking force is developed as a result of a failure in an automatic brake controller. In the event a braking output is developed when neither a brake pedal nor the automatic brake controller is operated, the safety mechanism determines the occurrence of an abnormality, and interrupts a communication between the master cylinder and the wheel cylinder while decompressing the oil pressure in the wheel cylinder by discharging it into a low pressure accumulator. The safety mechanism allows the automatic braking to be terminated, thus allowing a risk of a collision by a succeeding vehicle to be avoided and allowing a vehicle to continue running.

14 Claims, 5 Drawing Sheets

BRAKE SYSTEM

FIELD OF THE INVENTION

The invention relates to a vehicle brake system, and more particularly, to an improvement of a brake system with an automatic brake controller which actuates a brake booster without operating a brake pedal.

DESCRIPTION OF THE PRIOR ART

A brake system with an automatic brake controller which actuates a brake booster without the depression of a brake pedal is known in the art (see Japanese Laid-Open Paten Applications No. 262,958/1992 and No. 215,156/1986).

The first cited Application discloses an automatic brake controller including a solenoid disposed within a valve body, and an arrangement is made such that when the solenoid is operated, a valve mechanism is operated in response thereto. Thus, operating the solenoid is effective to actuate a brake booster without depressing a brake pedal.

The second cited Application discloses an automatic brake controller including a solenoid operated open/close valve which is operable to introduce a pressure fluid selectively into a variable pressure chamber. Thus, when the valve is operated, the pressure fluid is introduced into the variable pressure chamber to allow a brake booster to be actuated to function as an automatic brake without the depression of a brake pedal.

Such an automatic brake controller suffers from a likelihood that the brake booster may be accidentally actuated, though not required, as a result of a failure in an electrical system or that the operation of the automatic brake may not be terminated due to an electrical or mechanical failure despite an intended braking operation has taken place satisfactorily.

Such an accidental actuation of the automatic brake may introduce the risk of a collision by a following vehicle, and a failure to terminate the operation of the automatic brake may result in a difficulty to keep running a vehicle, both representing drawbacks.

SUMMARY OF THE INVENTION

In view of the foregoing, according to a first aspect of the invention, there is provided a brake system including a brake booster actuated in response to the operation of a brake operating member, an automatic brake controller adapted to actuate the brake booster without the operation of the brake operating member upon fulfillment of a given requirement, a master cylinder operated upon by an output from the brake booster, and a wheel cylinder operated upon by an output liquid pressure from the master cylinder for developing a braking force;

the brake system comprising a safety mechanism which comprises brake operation detecting means for detecting an operation of the braking operating member, automatic brake actuation command signal detecting means for detecting an actuation command signal to the automatic brake controller, and brake output detecting means for detecting whether or not the braking force is being developed, the arrangement being such that a communication between the master cylinder and the wheel cylinder is interrupted while decompressing the output liquid pressure introduced into the wheel cylinder in the event of an abnormality that the brake output detecting means detects the development of the braking force when neither the brake operation detecting means detects the operation of the brake operating member nor the automatic brake actuation command signal detecting means detects the automatic brake command signal.

According to a second aspect of the invention, there is provided a brake system including a brake booster actuated in response to the operation of a brake operating member, an automatic brake controller adapted to actuate the brake booster without the operation of the brake operating member upon fulfillment of a given requirement, a master cylinder operated upon by an output from the brake booster, and a wheel cylinder operated upon by an output liquid pressure from the master cylinder for developing a braking force;

the brake system comprising a safety mechanism which comprises accelerator operation detecting means for detecting an operation of an accelerator pedal, automatic brake actuation command signal detecting means for detecting an actuation command signal to the automatic brake controller, and brake output detecting means for detecting whether or not the braking force is being developed, the arrangement being such that a communication between the master cylinder and the wheel cylinder is interrupted while decompressing the output liquid pressure introduced into the wheel cylinder in the event of an abnormality that the brake output detecting means detects the development of the braking force when the automatic brake actuation command signal detecting means does not detect the actuation command signal and the accelerator operation detecting means detects the operation of the accelerator pedal.

According to the first aspect of the invention, in the event of abnormality that the automatic brake is accidentally actuated when no braking operation is required, the safety mechanism detects such occurrence to terminate the automatic brake, thus avoiding the risk of a collision by succeeding vehicle. Also, in the event of an abnormality that the automatic brake can not be terminated, such occurrence is detected by the safety mechanism, which again terminates the automatic brake, thus allowing a vehicle to continue running.

According to the second aspect of the invention, the provision of the accelerator operation detective means allows the operation of the automatic brake to be terminated upon start-up or acceleration of a vehicle where no operation of the automatic brake is required, thus enabling a smooth start-up or acceleration of the vehicle.

Above and other objects, features and advantages of the invention will become apparent from the following description of the embodiments thereof with reference to the attached drawings.

DETAILED DESCRIPTION OF THE EMBODIMENTS

Figure 1:
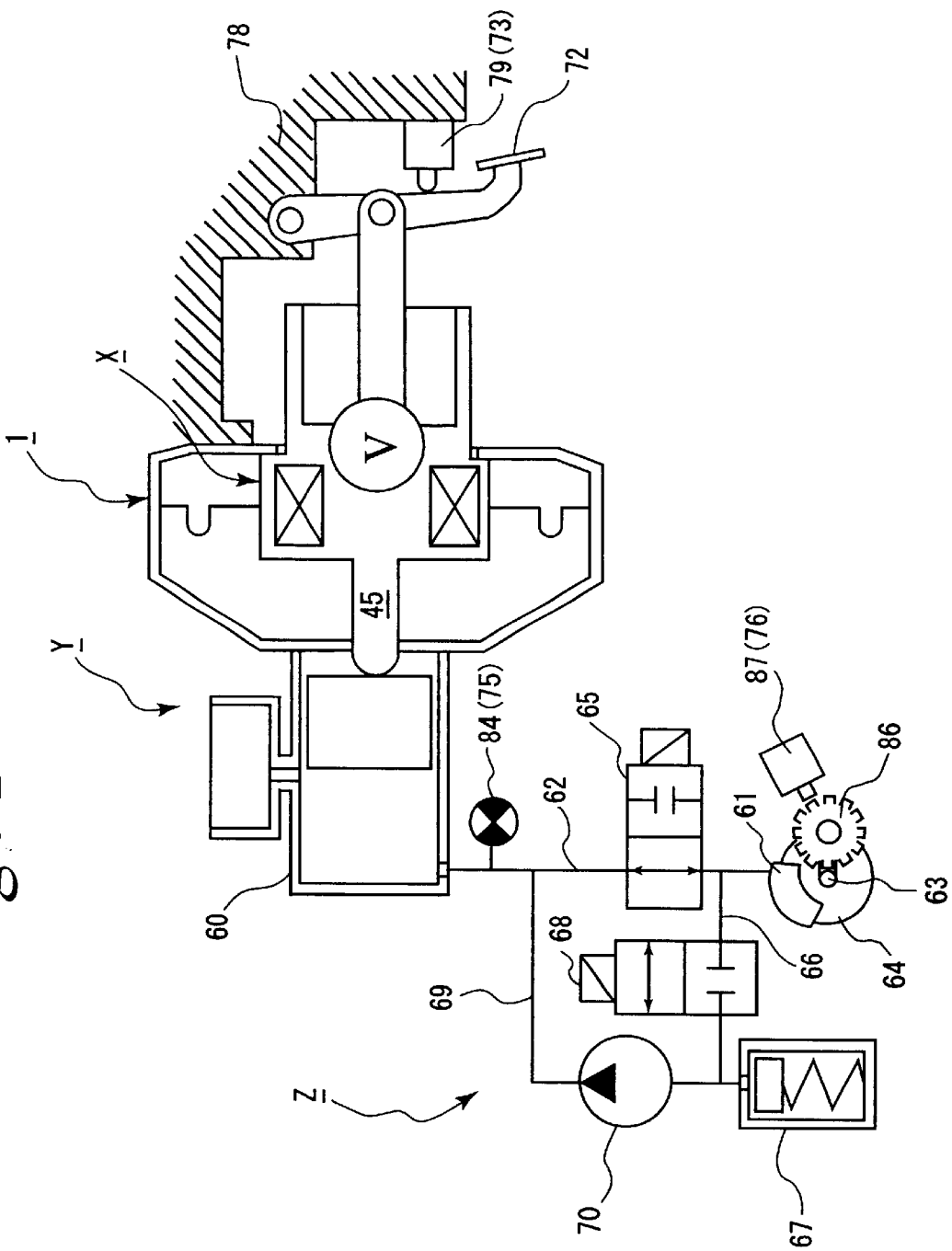
FIG. 1 is a schematic diagram of one embodiment of the invention.

Referring to the drawings, an embodiment of the invention will now be described below. FIG. 1 shows a brake system Y with an automatic brake controller X which permits a brake booster 1 to be actuated without operating a brake pedal.

Figure 2:
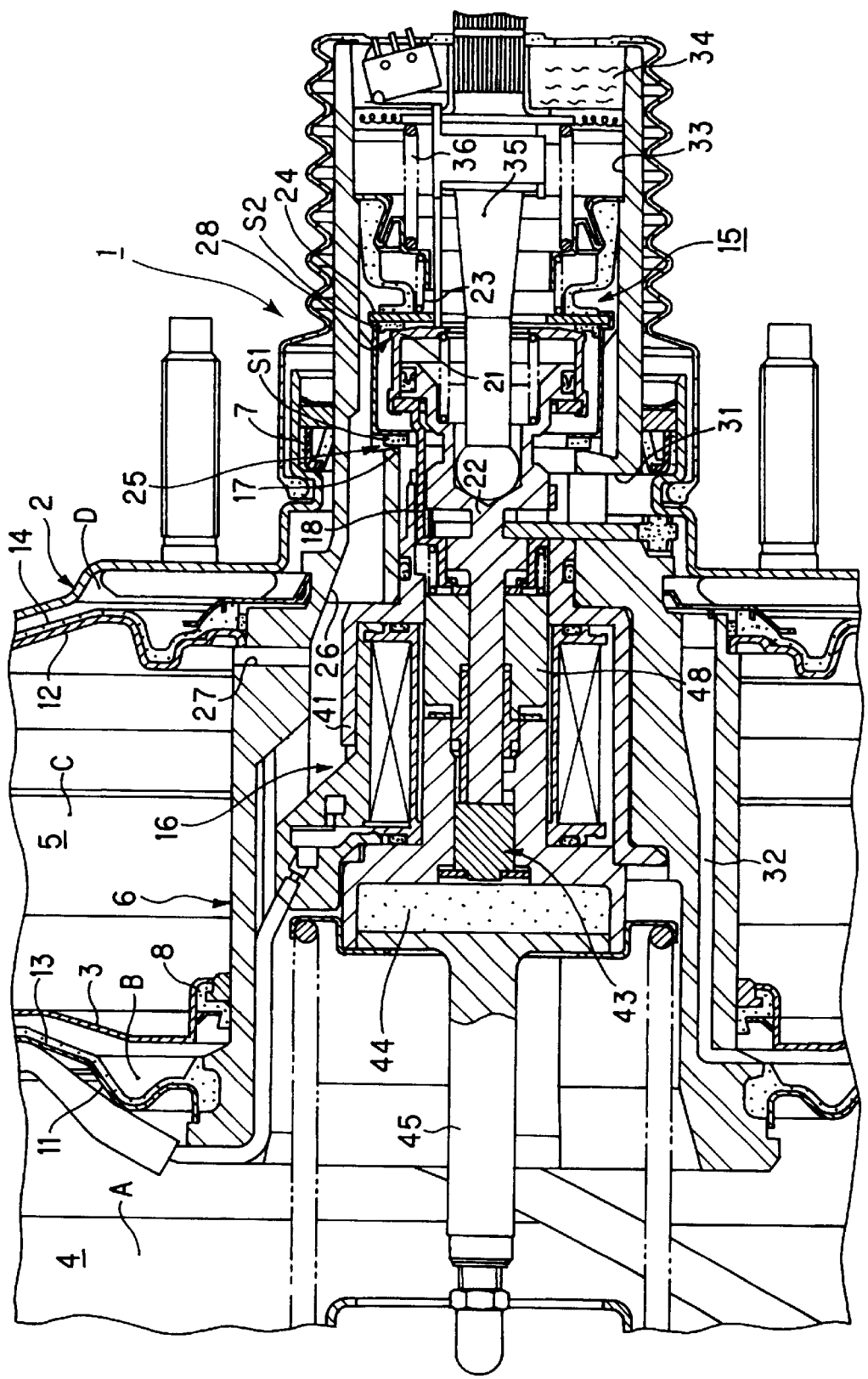
FIG. 2 is a cross section of the automatic brake booster 1.

As shown in FIG. 2, a brake booster 1 of tandem type includes a shell 2, the interior of which is partitioned by a centrally disposed center plate 3 into a forwardly located front chamber 4 and a rearwardly located rear chamber 5. A substantially tubular valve body 6 slidably extends through the inner periphery of the rear portion of the shell 2 and through the inner periphery of the center plate 3 with a hermetic seal being maintained by seal means 7 and 8, respectively.

A front power piston 11 and a rear power piston 12 are connected to the outer periphery of the valve body 6 at locations which are disposed within the front chamber 4 and the rear chamber 5, respectively. A front diaphragm 13 and a rear diaphragm 14 are applied to the back surfaces of the respective power pistons 11 and 12. The front diaphragm 13 partitions the front chamber 4 into a constant pressure chamber A and a variable pressure chamber B while the rear diaphragm 14 partitions the rear chamber 5 into a constant pressure chamber C and a variable pressure chamber D.

A valve mechanism 15 which switches a communication between the constant pressure chambers A, C and the variable pressure chambers B, D is disposed within the valve body 6, and a solenoid 16 which constitutes the automatic brake controller is disposed forwardly of the valve mechanism 15.

The valve mechanism 15 comprises an annular vacuum valve seat 17 formed on the inner periphery of the valve body 6, a tubular member 18 which is axially movable relative to the valve body 6, an annular atmosphere valve seat 21 formed on the tubular member 18, a valve plunger 22 slidably fitted into the tubular member 18 and coupled with an input shaft 35, and a valve element 24 adapted to be seated upon the both valve seats 17 and 21 as urged from the rear side by a spring 23.

A vacuum valve 25 is formed by a combination of the vacuum valve seat 17 and a first seat area S1 on the valve element 24 which is disposed for movement into engagement with or disengagement from the valve seat 17. A space located radially outward of the vacuum valve 25 communicates with the constant pressure chamber A through a first constant pressure passage 26 formed in the valve body 6, and the interior of the constant pressure chamber A communicates with the constant pressure chamber C through a second constant pressure passage 27 which continues from the first constant pressure passage 26. The constant pressure chamber A communicates with a source of negative pressure through a tubing, not shown, which is provided to introduce a negative pressure, whereby a negative pressure is normally introduced into the constant pressure chambers A and C.

An atmosphere valve 8 is formed by a combination of the atmosphere valve seat 21 and a second seat area S2 on the valve element 24 which is disposed for movement into engagement with or disengagement from the valve seat 21. A space located between the second seat area S2 and the first seat area S1 communicates with the variable pressure chamber D through a radially extending first variable pressure passage 31 formed in the valve body 6, and the variable pressure chamber D communicates with the variable pressure chamber B through a second variable pressure passage 32 formed in the valve body 6.

A space located radially inward of the atmosphere valve 28 communicates with the atmosphere through an atmosphere passage 33 formed in the valve body 6 and a filter 34 disposed therein.

The rear end of the valve plunger 22 is pivotally connected with the free end of an input shaft 35, and a spring 36 having a greater resilience than the spring 23 is disposed between the input shaft 35 and a retainer which is fitted on the valve body 6.

Accordingly, in the inoperative condition of the brake booster 1 of tandem type shown in FIG. 2, the second seat area S2 on the valve element 24 is seated on the atmosphere valve seat 21 to close the atmosphere valve 28 while the first seat area S1 on the valve element 24 is removed from the vacuum valve seat 17 to open the vacuum valve 25. It is to be noted that a terminal end of the input shaft 35 is coupled to a brake pedal 72 shown in FIG. 1, which serves as an operating member. In the inoperative condition, various chambers A, B, C and D communicate with each other and a negative pressure is introduced into these chambers A, B, C and D.

A housing 41 for the solenoid 16 is fitted into the inner periphery of the valve body 6 while maintaining a hermetic seal. A plunger plate 43 is slidably fitted into the inner periphery of the housing 41 toward its front end, and a reaction disc 44 is received in the front end of the housing 41.

An output shaft, 45 is disposed forwardly of the reaction disc 44 and a front or free end of the output shaft 45 projects externally through a front wall of the shell 2 for connection with a piston of a master cylinder 60. (See FIG. 1)

A piston 48, formed by a magnetizable material and forming part of the automatic brake controller X, is slidably fitted into the inner periphery of the housing 41 at a location rearward of the plunger plate 43 and a tubular member 18 is disposed rearward of the piston 48 for movement together with the piston 48.

In the present embodiment, the solenoid 16 is subject to an ON-OFF control. At this end, a controller, not shown, controls the operation of the solenoid 16.

When the solenoid 16 is energized by the controller, the piston 48 is driven forward relative to the housing 41 and the valve body 6, and its coupled tubular member 18 is also driven forward to operate the valve mechanism 15.

Specifically, under the condition shown in FIG. 2, the second seat area S2 on the valve element 24 is seated upon the atmosphere valve seat 21 to close the atmosphere valve 28 while the first seat area S1 on the valve element 24 is removed from the vacuum valve seat 17 to open the vacuum valve 25, whereby a negative pressure is introduced into the various chambers A, B, C and D to cause the booster to assume the inoperative condition.

If the brake pedal 72 is now depressed under the inoperative condition, the input shaft 35, the valve plunger 22, the tubular member 18 and the piston 48 are driven forward in an integral manner, whereby the atmosphere valve 28 which has been closed is opened while the vacuum valve 25 which has been open is closed to actuate the brake booster 1 of the tandem type.

When the solenoid 16 is energized by the controller mentioned above under the inoperative condition, the piston 48 and the tubular member 18 are driven forward relative to the valve plunger 22. Consequently, the atmosphere valve 28 which has been closed is opened while the vacuum valve 25 which has been open is closed, thus actuating the brake booster 1 of tandem type without the depression of the brake pedal 72. In this manner, the energization of the solenoid 16 under the inoperative condition shown actuates the brake booster 1 of tandem type as an automatic brake.

It is to be noted that it is known that an automatic break can be constructed by sidably providing a tubular member having an atmosphere valve seat between a valve body and a valve plunger, in the similar manner as in the present embodiment, and causing a relative displacement of the tubular member with respect to the valve body and the valve plunger by a solenoid to switch a valve mechanism.

It is also known that an automatic brake can be constructed by providing a path which communicates a variable pressure chamber with an outside while providing a solenoid operated valve which selectively opens or closes the path to introduce the atmosphere so that the opening of the valve provides a communication between the variable pressure chamber and the outside.

However, with automatic brake controllers of the types mentioned above, if the solenoid or the solenoid operated valve is energized as result of a failure in a electrical system when no braking operation is required, there is a likelihood that the automatic brake may be accidentally actuated presenting a risk of collision by a succeeding vehicle. Alternatively, an electrical or mechanical failure such as a sticking of the tubular member or the solenoid operated valve during the automatic brake operation may fail to terminate the automatic brake when the braking force is no longer required, thus presenting a difficulty to a running of a vehicle.

To accommodate for this, in the present embodiment, there is provided a safety mechanism Z which allows unnecessary braking force to be terminated which may be produced during the automatic brake operation and which allows a braking force to be adjusted in accordance with a brake pedal.

Specifically, referring to FIG. 1, the brake system Y of the present embodiment comprises a master cylinder 60 coupled to the output shaft 45 of the brake booster 1, and a braking liquid passage 62 for providing a communication between a liquid pressure chamber in the master cylinder 60 and a wheel cylinder 61, which is adapted to be pressed against a rotor 64 on an axle in response to an output liquid pressure from the master cylinder 60.

Referring to FIG. 1, the safety mechanism Z comprises a first open/close valve 65 disposed in the braking liquid passage 62 and normally opened to provide a communication between the master cylinder 60 and the wheel cylinder 61, a low pressure accumulator 67 connected through a conduit 66 to a point in the braking liquid passage 62 which is located closer to the wheel cylinder 61 than the first open/close valve 65 for accumulating a liquid pressure for the wheel cylinder 61, a second open/close valve 68 disposed upstream of the low pressure accumulator 67 and normally closed to interrupt a communication between the wheel cylinder 61 and the low pressure accumulator 67, and a pump 70 disposed in a return passage 69 which connects the low pressure accumulator 67 with a point in the braking liquid passage 62 which is located upstream of the first open/close valve 65.

Figure 3:
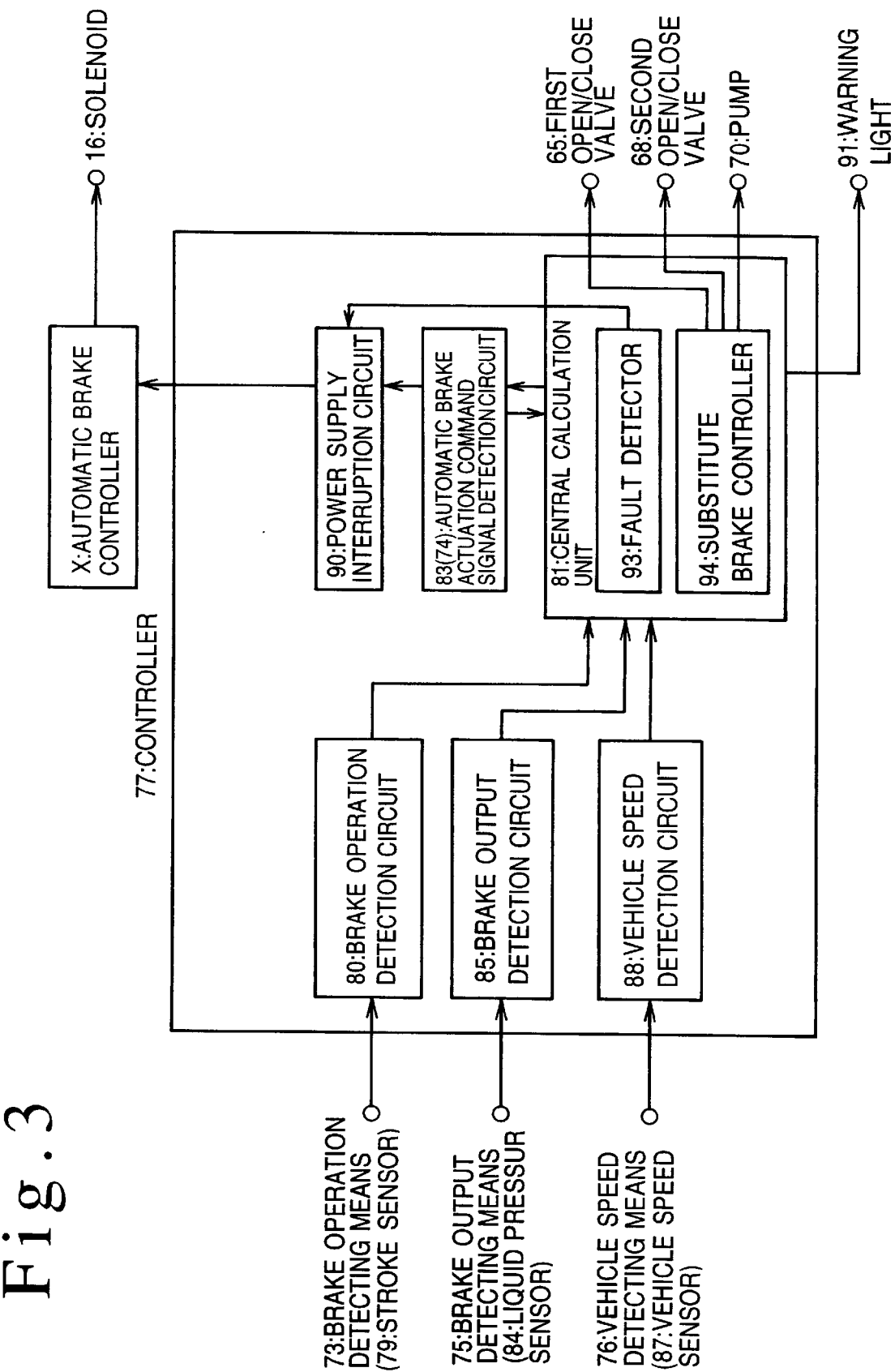
FIG. 3 is a circuit diagram of a controller 77 of a safety mechanism Z.

In addition, the safety mechanism comprises brake operation detecting means 73 which detects an operation of the brake pedal 72, automatic brake actuation command signal detecting means 74 (see FIG. 3) which detects an actuation command signal that is fed from the controller 77 shown in FIG. 3 to the automatic brake controller X, brake output detecting means which detects a brake output and a vehicle speed detecting means 76 which detects a vehicle speed, the detected values from these detecting means 73, 74, 75 and 76 being input to the controller 77.

As shown in FIG. 1, the brake operation detecting means 73 is secured to a car body 78, and includes a sensor which is formed by a stroke sensor 79, which is known in the art and which is coupled to the brake pedal 72. As the brake pedal 72 is depressed from its inoperative position shown, the sensor moves, and the travel of the sensor may be detected to detect a manipulated variable or the amount by which the brake pedal 72 has been operated. The brake operation detecting means 73 may also comprise a pedal depressing force sensor or may comprise a brake switch which detects an operation of the brake pedal 72.

A value detected by the stroke sensor 79 is input to a brake operation detection circuit 80 of the controller 77, which delivers a converted signal to a central calculation unit 81, which will be described in detail later.

As shown in FIG. 3, automatic brake actuation command signal detecting means 74 comprises an automatic brake actuation command signal detection circuit 83 which detects an actuation command signal which is supplied from the central calculation unit 81 to the automatic brake controller X through a power supply interruption circuit 90. A detection signal from the automatic brake actuation command signal detection circuit 83 is also delivered to the central calculation unit 81. It should be noted that the automatic brake actuation command signal detection circuit 83 may be provided within the central calculation unit 81.

Brake output detecting means 75 is disposed in the braking liquid passage 62 toward the master cylinder 60, and comprises a liquid pressure sensor 84 which detects a liquid pressure within the passage 62. As the brake booster 1 is actuated to drive the output shaft 45 forward, an output liquid pressure is developed in the master cylinder 60, and accordingly, it is possible to detect whether or not a braking force is actually developed.

It is to be understood that the brake output detecting means 75 may comprise a pressure sensor which detects a pressure in the variable pressure chamber or a stroke sensor which detects a forward movement of the valve body.

A value detected by the liquid pressure sensor 84 is input to a brake output detection circuit 85, which delivers a converted signal to the central calculation unit 81.

The vehicle speed detecting means 76 comprises a rotary member 86 provided with projections at an equal spacing around the outer periphery thereof and which rotates together with the axle 63, and a vehicle speed sensor 87 including a coil, across which a voltage is generated as each of the projections passes through a magnetic field. A voltage signal detected by the vehicle speed sensor 87 is input to a vehicle speed detection circuit 88, which delivers a converted signal to the central calculation unit 81.

The central calculation unit 81 comprises a fault detector 93 which interrupts a power supply to the automatic brake controller X upon detecting an abnormality that the automatic brake controller X is activated to develop a braking force even though the brake pedal 72 is not operated and no actuation command signal requiring an actuation of the automatic brake controller X is delivered, and a substitute brake controller 94 which replaces the controller associated with the brake pedal 72 to control the liquid pressure in the wheel cylinder 61 in the event of the above mentioned abnormality.

Referring to the flow chart shown in FIG. 4, a procedure from the detection of a fault in the automatic brake to the termination of unnecessary brake output which take place in the fault detector 93 will be described below.

Specifically, the fault detector 93 is designed to initially determine a signal which is input from the brake operation detection circuit 80 at step S1. If the brake pedal 72 has been operated, it determines that the vehicle is being decelerated or at rest, whereupon it cancels subsequent steps S2 to S9 to return to step S1 again. As long as the brake pedal 72 is not released, the step S1 is repeated.

On the other hand, when the brake pedal 72 is not operated, the operation proceeds from step S1 to step S2.

At step S2, the fault detector 93 determines a signal which is input from the automatic brake actuation command signal detection circuit 83. If the automatic brake actuation command signal detection circuit 83 has detected an actuation command signal, the detector 93 determines that the vehicle is being decelerated and then cancels subsequent steps S3 to S9 to return to step S1.

On the other hand, if the automatic brake actuation command signal detection circuit 93 has not detected an actuation command signal, the operation proceeds from step S2 to step S3.

At step S3, the fault detector 93 determines a signal which is input from the brake output detection circuit 85. If a signal from the brake output detection circuit 85 indicates that no brake output is developed when there is no operation of the brake pedal 72 and when the automatic brake actuation command signal detection circuit 83 has not detected an actuation command signal, the fault detector 93 cancels subsequent steps S4 to S9 and returns the operation to step S1.

On the other hand, if the brake output detection circuit 85 has detected a brake output, or if it detects a brake output despite there is no operation of the brake pedal 72 and the automatic brake actuation command signal detection circuit 83 has not detected an actuation command signal, the fault detector 93 determines the occurrence of an abnormality, and then proceeds through steps 4 to 9 to terminate the development of the brake output.

Initially, at step S4, the fault detector 93 delivers a signal to the power supply interruption circuit 90 to interrupt the current flow to the solenoid 16 of the brake booster 1 which constitutes the automatic brake controller X in order to terminate the development of unnecessary brake output.

In response to a signal from the fault detector 93, the power supply interruption circuit 90 interrupts a circuit connection between a power supply, not shown, and the solenoid 16 to cease the current supply to the solenoid 16. Thereupon, the tubular member 18 which has been advanced as attracted by the solenoid 16 now retracts, whereby the valve mechanism 15 of the brake booster 1 resumes its inoperative position and the brake booster 1 resumes the inoperative position, thereby terminating the brake output.

The power supply interruption circuit 90 is designed so that once it is actuated, it cannot be reset until the fault is remedied. Accordingly, unless the fault is remedied, a braking operation which is initiated by the automatic brake controller X cannot subsequently take place.

At this end, the fault detector 93 activates a warning light 91 mounted onboard the vehicle at the next step S5, allowing a driver of the vehicle to recognize that the automatic brake is no longer useable.

Upon completing the step S5, the fault detector 93 then determines a signal which is input from the brake output detection circuit 85 at step S6. If the liquid pressure in the braking liquid passage 62 is reduced to a level comparable to the liquid pressure which prevails during the inoperative condition, the fault detector determines that the automatic brake has been terminated. Even though the braking operation initiated by the automatic brake controller X is not useable under this condition, a normal brake operation can take place by at least operating the brake pedal 72, and accordingly, the subsequent steps S6 to S9 are canceled and the operation returns to step S1.

On the other hand, if the liquid pressure in the braking liquid passage 62 remains to be higher than the liquid pressure which prevails during the inoperative condition, the fault detector determines that something in the automatic brake controller X or the valve mechanism 15 or the like in the brake booster 1, which is actuated in accordance with the automatic brake controller X, has undergone a mechanical failure and cannot be returned to its inoperative position. In this event, it is difficult for a driver of the vehicle to operate the brake pedal 72 to remove the mechanical failure. If the failure persists during the running of the vehicle, for example, the vehicle will decelerate and may likely be subject to a collision by a succeeding vehicle. If the vehicle is at rest, the vehicle cannot be started up.

Accordingly, the substitute brake controller 94 operates in the subsequent steps S7 and S8 to terminate the development of unnecessary brake output. Specifically, at step S7, the substitute brake controller 94 operates to close the first open/close valve 65 connected in the braking liquid passage 62 and which remains open normally, thus interrupting the supply of the liquid pressure from the master cylinder 60 to the wheel cylinder 61. However, this leaves the wheel cylinder 61 still activated by the liquid pressure, and accordingly, the substitute brake controller 94 decompresses the liquid pressure which is introduced into the wheel cylinder 61 at step S8, thus releasing the brake.

At step S8, the second open/close valve 68 connected in the conduit 66 and which normally remains closed is opened, thereby allowing the liquid pressure which has been introduced into the first open/close valve 65 to be discharged into the low pressure accumulator 67 to be accumulated therein, whereby the wheel cylinder 61 is deactivated to release the brake in a forcible manner.

After step S8, the fault detector 93 changes a value stored in a memory A from a "0" representing that the brake system Y is normal to "1" representing an abnormal condition in which the automatic brake controller X or the like has failed and the brake output has been released by operating the first open/close valve 65 and the second open/close valve 68, at step S9. The value "1" can not be reset unless the fault is remedied.

Figure 4:
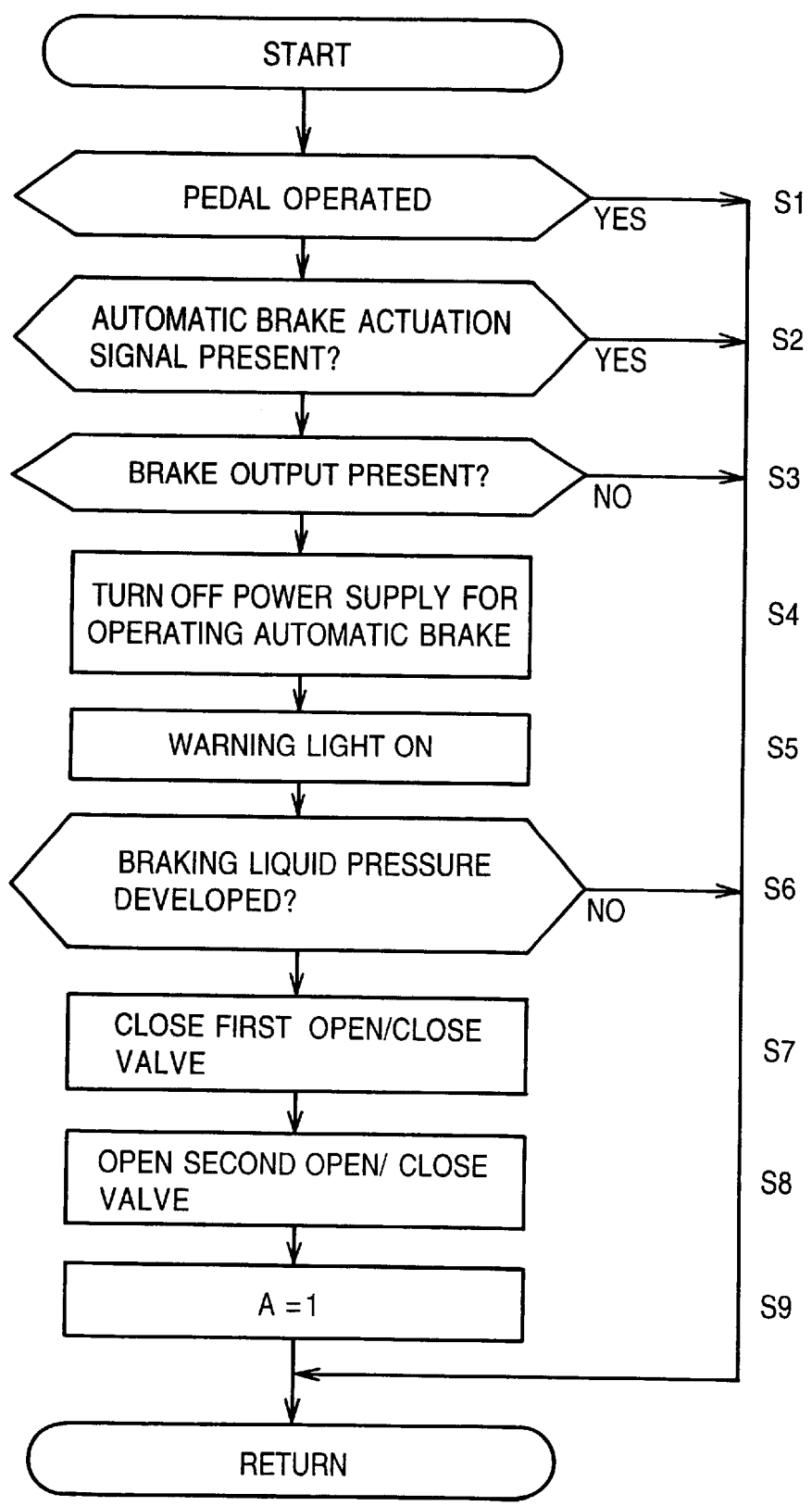
FIG. 4 is a flow chart covering from the detection of a failure of an automatic brake to the termination of unnecessary brake output.

It will be seen that the described operation according to the flow chart shown in FIG. 4 has terminated the development of unnecessary braking force. However, it will be seen that the first open/close valve 65 remains closed to interrupt the communication between the master cylinder 60 and the wheel cylinder 61, and accordingly, if a driver operates the brake pedal 72, no braking force can be developed. Accordingly, in the present embodiment, whenever the driver has operated the brake pedal 72, the substitute brake controller 94 allows the development of the braking force to be controlled.

Figure 5:
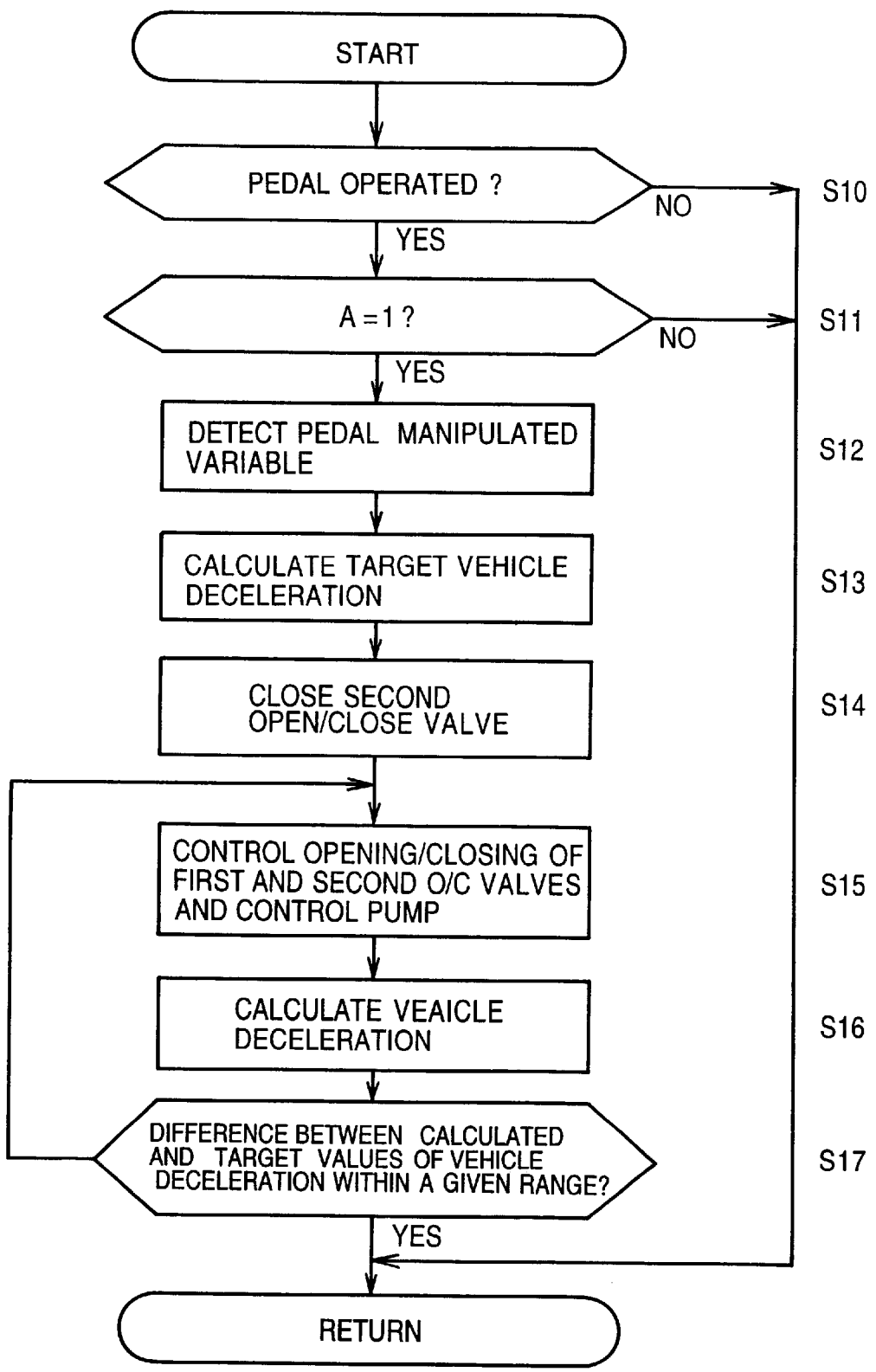
FIG. 5 is a flow chart of a braking force control during a failure of an automatic brake.

The substitute brake controller 94 controls the braking force in accordance with the flow chart shown in FIG. 5. Specifically, at step S10, it determines a signal which is input from the brake operation detection circuit 83. If the brake pedal 72 is not depressed, it determines there is no need for brake operation, and then determines the signal again at step S10. Subsequently, the step S10 is repeated until the brake pedal 72 is subsequently operated.

On the other hand, when the brake pedal 72 has been operated, the operation proceeds to step S11. At step S11, the substitute brake controller 94 determines if the value stored in the memory A is either "0" or "1". If the stored value is "0", it determines that the brake system Y is in its normal condition, and returns the operation to S10. However, if the stored value is "1", it determines that there is some abnormality in the brake system Y, which prevents any braking force from being developed if the brake pedal 72 is operated, and the operation proceeds to step S12.

At step S12, the substitute brake controller 94 determines a controlled variable for the signal which is input from the brake operation detection circuit 83, and at step S13, it compares the controlled variable thus determined against prestored data, thus determining a target deceleration of the vehicle. Since the determination of the deceleration of the vehicle is well known in the art as occurs in ABS system, it will not be described.

After the target deceleration is determined at step S13, the substitute brake controller 94 closes the second open/close valve 68 which was opened by the fault detector 93, at step S14. In this manner, the communication between the wheel cylinder 61 and the low pressure accumulator 67 is interrupted.

At step S15, the substitute brake controller 94 maintains the first open/close valve 65 open for a given time interval while activating the pump 70. This allows the master cylinder 90 which has accumulated the output liquid pressure to introduce the output liquid pressure into the wheel cylinder 61, whereby the vehicle speed can be decelerated.

At step S16, the substitute brake controller processes the signal which is input from the vehicle speed detection circuit 88 to calculate the vehicle deceleration, and then determines if a difference between the calculated vehicle deceleration and the target deceleration is within a given value, at step S17. If the speed difference lies within a given value, the substitute brake controller closes both the first open/close valve 65 and the second open/close valve 68 to maintain the braking liquid pressure, and the operation returns to step S10.

By contrast, if the speed difference does not lie within the given value, the operation returns to step S15, and if the calculated vehicle deceleration is less than the target deceleration, the substitute brake controller maintains the first open/close valve 65 open for another given time interval to intensify the braking liquid pressure. On the contrary, if the vehicle deceleration is higher than the target deceleration, the substitute brake controller maintains the second open/close valve 68 open for a given interval to cause the liquid pressure in the wheel cylinder 61 to be discharged into the low pressure accumulator 67, thus decompressing the braking liquid pressure. The operations at steps S16 and S17 take place when the vehicle speed is less than the target deceleration while the operations at steps S15 to S17 take place until the speed difference lies within the given value.

As long as the braking force is controlled by the substitute brake controller 94, the pump 70 is set in operation, and accordingly, the braking liquid which is discharged from the wheel cylinder 61 into the low pressure accumulator 67 is returned to the master cylinder 60, thus preventing a bottoming of the master cylinder 60 and allowing the described braking force control to be repeated.

As described above, with the present embodiment, if an electrical or mechanical failure occurs in the automatic brake controller X to develop unnecessary braking force, the safety mechanism Z enables any risk of an accident by the accidental brake operation to be avoided while allowing the vehicle to continue running.

In the embodiment described above, the brake booster which uses a solenoid has been employed, but the invention is not limited thereto and the invention can be used in a brake booster with a similar function and effect in which a communication path is provided to provide a communication of the variable pressure chamber with the outside and an open/close valve may be disposed in the communication path to open or close it under the control of the automatic brake controller.

Alternatively, the described embodiment may be provided with an accelerator operation detecting means which detects an operation of an accelerator pedal. In the event of an abnormality that brake output detecting means detects the development of a brake output when the accelerator operation detecting means has detected the operation of the accelerator pedal, but when the automatic brake actuation command signal detecting means 74 has not detected an actuation command signal to the automatic brake, a determination may be rendered that unnecessary braking force is developed as a result of a failure in the automatic brake controller X, thus terminating the unnecessary brake output through the control by the fault detector 93 of the controller 77.

With this arrangement, the back-up of the brake operation detecting means 73 may be provided when an operation of the accelerator is detected because it is known in this instance that a driver is willing to accelerate the vehicle or to start the vehicle and because it is indirectly detected that no operation of the brake pedal 72 has been detected.

In particular, the provision of the accelerator operation detecting means enables the actuation of the automatic brake, which is unnecessary when starting or accelerating the vehicle, can be terminated, thus permitting a smooth starting or acceleration of the vehicle.

In addition, in the present embodiment, there is provided the function of blocking a flow of the braking liquid from the master cylinder 60 to the low pressure accumulator 67. However, the invention is not limited thereto, but a pump of any other configuration may be used by providing a check valve.

In the present embodiment, the flow chart comprises two sections, but the invention is not necessarily limited thereto, but may comprise a single flow chart.

While the invention has been described above in connection with a preferred embodiment thereof, it should be understood that a number of changes, modifications and substitutions therein are possible from the above disclosure without departing from the spirit and the scope of the invention defined by the appended claims.

What is claimed is:

1. A brake system including a brake booster actuated in response to a brake operating member, an automatic brake controller for actuating the brake booster upon fulfillment of a given requirement and without operation of the brake operating member, a master cylinder operated on by an output from the brake booster, a wheel cylinder operated on by an output liquid pressure from the master cylinder to develop a braking force and a safety mechanism comprising brake operation detection means for detecting operation of the brake operating member, automatic brake actuation command signal detecting means for detecting an actuation command signal to the automatic brake controller, brake output detecting means for detecting whether or not a braking force is developed and power supply interrupting means for interrupting a power supply to the automatic brake controller, the communication between the master cylinder and the wheel cylinder being interrupted and the output liquid pressure which has been introduced into the wheel cylinder decompressed when an abnormality occurs that the brake output detecting means detects the development of braking force and either the brake operation detecting means has not detected operation of the brake operating member, the automatic brake actuation command signal detecting means has not detected an actuation command signal or the power supply interrupting means has interrupted a power supply to the automatic brake controller.

2. A brake system according to claim 1 in which the safety mechanism comprises a first open/close valve disposed in a braking liquid passage which provides communication between the master cylinder and the wheel cylinder and which is normally open, a low pressure accumulator connected to a point in the braking liquid passage which is located nearer the wheel cylinder than the first open/close valve for accumulating the braking liquid in the braking liquid passage, and a second open/close valve disposed between the braking liquid passage and the low pressure accumulator and which is normally closed, the first open/close valve being closed and simultaneously the second open/close valve being opened in the event of said abnormality, thus decompressing the output liquid pressure which is introduced into the wheel cylinder.

3. A brake system according to claim 2 in which when the brake operation detecting means detects an operation of the brake operating member under the condition that the output liquid pressure which has been introduced into the wheel cylinder has been decompressed in the event of said abnormality, the safety mechanism closes the second open/close valve to interrupt the communication between the wheel cylinder and the low pressure accumulator and opens the first open/close valve for a given time interval to supply the output liquid pressure from the master cylinder to the wheel cylinder.

4. A brake system according to claim 3 in which the brake operation detecting means has a function of detecting a manipulated variable of the brake operating member, the safety mechanism controlling the time interval during which the first open/close valve is opened in accordance with the manipulated variable of the brake operating member.

5. A brake system according to claim 2 in which the safety mechanism also comprises vehicle speed detecting means for detecting a vehicle speed, the brake operation detecting means having a function of detecting a manipulated variable of the brake operating member and the arrangement being such that when the brake operation detecting means detects an operation of the brake operating member under the condition that the output liquid pressure which has been introduced into the wheel cylinder has been decompressed in the event of said abnormality, the safety mechanism controls the first and the second open/close valve so that the output liquid pressure is controlled to a liquid pressure where a vehicle deceleration corresponding to the manipulated variable of the brake operating member can be obtained.

6. A brake system according to claim 2, further comprising a return passage providing communication between the low pressure accumulator and the master cylinder, and pump means disposed in the return passage for returning the brake liquid in the low pressure accumulator to the master cylinder.

7. A brake system including a brake booster actuated in response to a brake operating member, an automatic brake controller for actuating the brake booster upon fulfillment of a given requirement and without operation of the brake operating member, a master cylinder operated on by an output from the brake booster, a wheel cylinder operated on by an output liquid pressure from the master cylinder to develop a braking force and a safety mechanism comprising an accelerator operation detecting means for detecting operation of an accelerator pedal, automatic brake actuation command signal detecting means for detecting an actuation command signal to the automatic brake controller, brake output detecting means for detecting whether or not a braking force is developed and power supply interrupting means for interrupting a power supply to the automatic brake controller, the communication between the master cylinder and the wheel cylinder being interrupted and the output liquid pressure which has been introduced into the wheel cylinder decompressed when an abnormality occurs that the brake output detecting means detects the development of braking force and either the automatic brake actuation command signal detecting means has not detected an actuation command signal, the accelerator operation detecting means detects operation of the accelerator pedal or the power supply interrupting means has interrupted a power supply to the automatic brake controller.

8. A brake system according to claim 7 in which the safety mechanism comprises a first open/close valve disposed in a braking liquid passage which provides communication between the master cylinder and the wheel cylinder and which is normally open, a low pressure accumulator connected to a point in the braking liquid passage which is located nearer the wheel cylinder than the first open/close valve for accumulating the braking liquid in the braking liquid passage, and a second open/close valve disposed between the braking liquid passage and the low pressure accumulator and which is normally closed, the first open/close valve being closed and simultaneously the second open/close valve being opened in the event of said abnormality, thus decompressing the output liquid pressure which is introduced into the wheel cylinder.

9. A brake system according to claim 8 in which when the brake operation detecting means detects an operation of the brake operating member under the condition that the output liquid pressure which has been introduced into the wheel cylinder has been decompressed in the event of said abnormality, the safety mechanism closes the second open/close valve to interrupt the communication between the wheel cylinder and the low pressure accumulator and opens the first open/close valve for a given time interval to supply the output liquid pressure from the master cylinder to the wheel cylinder.

10. A brake system according to claim 9 in which the brake operation detecting means has a function of detecting a manipulated variable of the brake operating member, the safety mechanism controlling the time interval during which the first open/close valve is opened in accordance with the manipulated variable of the brake operating member.

11. A brake system according to claim 8 in which the safety mechanism also comprises vehicle speed detecting means for detecting a vehicle speed, the brake operation detecting means having a function of detecting a manipulated variable of the brake operating member and the arrangement being such that when the brake operation detecting means detects an operation of the brake operating member under the condition that the output liquid pressure which has been introduced into the wheel cylinder has been decompressed in the event of said abnormality, the safety mechanism controls the first and the second open/close valve so that the output liquid pressure is controlled to a liquid pressure where a vehicle deceleration corresponding to the manipulated variable of the brake operating member can be obtained.

12. A brake system according to claim 8, further comprising a return passage providing communication between the low pressure accumulator and the master cylinder, and pump means disposed in the return passage for returning the brake liquid in the low pressure accumulator to the master cylinder.

13. A brake system including a brake booster actuated in response to depression of a brake pedal, an automatic brake controller for actuating the brake booster upon fulfillment of a given requirement and independent of the brake pedal being depressed, a master cylinder operated on by an output from the brake booster, a wheel cylinder operated on by an output liquid pressure from the master cylinder to develop a braking force and a safety mechanism comprising brake operation detection means for detecting depression of the brake pedal, automatic brake activation command signal detecting means for detecting an actuation command signal to the automatic brake controller and brake output detecting means for detecting whether or not a braking force is developed, the communication between the master cylinder and the wheel cylinder being interrupted and the output liquid pressure which has been introduced into the wheel cylinder decompressed when an abnormality occurs that the brake output detecting means detects the development of braking force and either the brake operation detecting means has not detected the depression of the brake pedal or the automatic brake actuation command signal detecting means has not detected an actuation command signal.

14. A brake system including a brake booster actuated in response to depression of a brake pedal, an automatic brake controller for actuating the brake booster upon fulfillment of a given requirement and independent of the brake pedal being depressed, a master cylinder operated on by an output liquid pressure from the master cylinder to develop a braking force and a safety mechanism comprising an accelerator operation detecting means for detecting operation of an accelerator pedal, automatic brake actuation command signal detecting means for detecting an actuation command signal to the automatic brake controller and brake output detecting means for detecting whether or not a braking force is developed, the communication between the master cylinder and the wheel cylinder being interrupted and the output liquid pressure which has been introduced into the wheel cylinder decompressed when an abnormality occurs that the brake output detecting means detects the development of braking force and either the automatic brake actuation command signal detecting means has not detected an actuation command signal or the accelerator operation detecting means detects operation of the accelerator pedal.

* * * * *